United States Patent [19]
Thomas et al.

[11] Patent Number: 5,784,228
[45] Date of Patent: Jul. 21, 1998

[54] THIN FILM MAGNETIC HEAD WITH COMPOUND ANGLED INSULATION LAYER

[75] Inventors: Mark D. Thomas, Hollister; Son Tran, Milpitas; Chen Lee, Sunnyvale, all of Calif.

[73] Assignee: Read-Rite Corporation, Milpitas, Calif.

[21] Appl. No.: 890,392

[22] Filed: Jul. 9, 1997

Related U.S. Application Data

[63] Continuation of Ser. No. 523,615, Sep. 5, 1995, abandoned.
[51] Int. Cl.⁶ ................................................. G11B 5/147
[52] U.S. Cl. ............................................................ 360/126
[58] Field of Search ............................... 360/126, 119, 360/120, 121, 122

[56] References Cited

U.S. PATENT DOCUMENTS 5,241,440  8/1993  Ashida et al. ........................... 360/126
5,287,239  2/1994  Iwasaki .................................. 360/126
5,559,653  9/1996  Shouji et al. ........................... 360/126

*Primary Examiner*—Craig A. Renner
*Attorney, Agent, or Firm*—Nathan N. Kallman

[57] ABSTRACT

A magnetic head is fabricated with a thin film transducer including first and second magnetic layers, having an insulation layer defining a transducing gap between the pole tips of the magnetic layers, and a top insulating layer over the transducer for protecting the transducer from humidity and mechanical shock. The insulation gap layer is configured with a compound angled section of a baked resist insulation layer having a steep angular portion and a second angled portion of substantially the same slope preceding a substantially flat area. In this way, maximum contact is provided between the protective top insulation and the lower insulation gap layer in order to minimize cracking, without displacing the coil assembly from its preferred location close to zero throat so that optimum coil efficiency is obtained.

6 Claims, 5 Drawing Sheets

THIN FILM MAGNETIC HEAD WITH COMPOUND ANGLED INSULATION LAYER

This application is a continuation of application Ser. No. 08/523,615, filed Sep. 5, 1995, now abandoned.

FIELD OF THE INVENTION

This invention relates to thin film magnetic heads and in particular to the formation of the insulating layers of the magnetic yoke of a thin film head.

BACKGROUND OF THE INVENTION

Thin film magnetic heads are used extensively in data processing systems, such as disk drives. A typical thin film magnetic head comprises, inter alia, a nonmagnetic ceramic substrate, first and second magnetic pole layers that form a yoke, and an electrically conductive coil assembly. The magnetic flux that is generated in the yoke interacts with current in the conducting coil to effectuate transducing of data signals during write and read modes. Conventionally, the first magnetic yoke layer P1 is formed as a substantially planar layer above the substrate. The second magnetic yoke layer P2 is formed in spaced relation above the P1 layer with the coil assembly interposed between the two magnetic layers. An insulating layer designated as $I_0$, typically made of alumina, provides a transducing gap between two pole tips located at the narrowed end of the yoke structure that interfaces with a magnetic medium during reading and recording of data signals. An insulating layer designated as $I_2$, made of baked photoresist, is laid down over the conducting coil. An overcoat insulation layer, also made of alumina, is deposited over the transducer to encapsulate the transducer structure and provide protection against deleterious ambient effects, such as humidity and possible mechanical damage. The thin film transducer is disposed at the trailing end of an air bearing slider which has an air bearing surface (ABS). The transducing gap insulation layer is disposed at a 90° angle relative to the insulating overcoat layer. Typically, the protective insulating overcoat layer is in contact with the underlying transducing gap layer, both layers being made of similar insulation material, such as alumina, in conventional thin film heads.

One problem that has been experienced during head production and during operation in a disk drive is cracking of the insulation, particularly in the region of the air bearing surface of the slider which is close to or in contact with the recording surface of the magnetic disk. Cracking generally occurs between the overcoat insulation and the lower insulation gap layer, especially when exposed to high temperature and high humidity, which are applied during reliability testing. Cracking also occurs during machining, lapping and subsequent assembly steps, as well as during disk drive operation. The cracking typically is seen on the ABS region of the magnetic head.

SUMMARY OF THE INVENTION

An object of this invention is to provide a thin film magnetic head structure which results in a reduction of cracking that has been observed to occur between insulation layers.

According to this invention, the contact region between the overcoat insulation layer and the lower transducing gap layer of the same material, which is close to the zero throat of the transducer and the air bearing surface of the slider is maximized. Zero throat is defined as the point at the pole tip area at which the upper P2 pole layer diverges from the lower P1 pole layer towards the back yoke region. The gap insulation is formed with a flat area which is slightly larger than the width of the pole tip of the upper magnetic pole layer P2. This flat area of insulation is followed by a steep arcuate section configured with a compound angle, having a steep angular portion and a portion with a lesser slope. The compound angled section is closely spaced from the pole tips at the air bearing surface of the slider on which the magnetic transducer is disposed. The arcuate section angles from the flat area, preferably at an angle of approximately 40° or more, thereby allowing more contact between the overcoat insulation layer and the insulation gap layer. With the configuration of insulation layers formed in accordance with this invention, cracking is effectively minimized. Adequate insulation is maintained for the coil assembly, and the coil turns are able to remain close to zero throat and the air bearing surface of the slider so that the coil assembly and transducer can operate at high efficiency.

BRIEF DESCRIPTION OF THE DRAWING

The invention will be described in greater detail with reference to the drawing in which.

DETAILED DESCRIPTION OF THE PREFERRED EMBODIMENT

Figure 1:
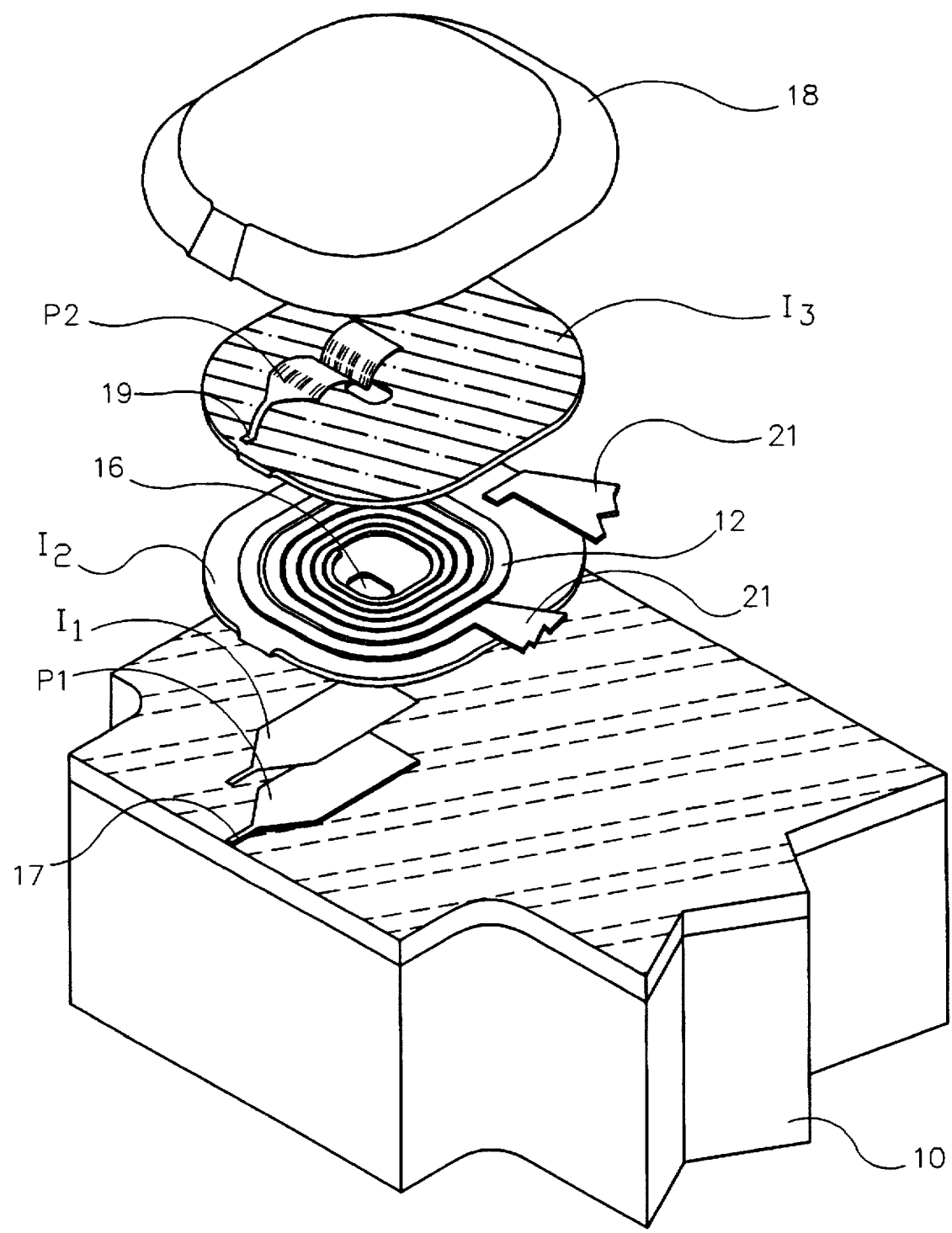
FIG. 1 is an isometric view, partly broken away, of a magnetic head assembly including an air bearing slider and magnetic transducer, made in accordance with the prior art.

With reference to FIG. 1, a prior art thin film head is formed with a magnetic yoke comprising a first pole layer P1 and a second pole layer P2. The pole layers are preferably made of a nickel-iron alloy, such as Permalloy. The P1 layer is deposited over a very thin Permalloy seed layer which was formed over an alumina undercoat that was laid down on a polished surface of a ceramic substrate 10. A first insulating layer $I_0$ of aluminum oxide is deposited over the P1 layer to define a transducing gap between the narrow pole tips 17 and 19 of the P1 and P2 layers respectively. A patterned electrical coil structure 12 is then formed and defined by photolithography masking techniques and chemical etching. A baked resist insulation layer $I_2$ is deposited to cover the coil structure 12 and to insulate the coil structure from the conductive P1 and P2 magnetic layers. Bonding pads 21, interconnects and wiring are provided to conduct data signals from and to the head during the read and write modes. Vias are provided to allow electrical connection of the coil assembly to an external head circuit. An insulating layer $I_3$ is provided between the bonding pads 21 and the P2 magnetic layer. A second magnetic layer P2 is formed to be in magnetic contact with the P1 layer through a via 16, so that a continuous magnetic flux path is provided. The P1 and P2 layers delineate the yoke structure of the magnetic head. A protective insulating overcoat 18 is then deposited over the head structure, by r.f. radio frequency sputtering for example, to provide structural strength and protection during the machining and lapping of the air bearing slider or the substrate on which the thin film head is formed.

Figure 2A:
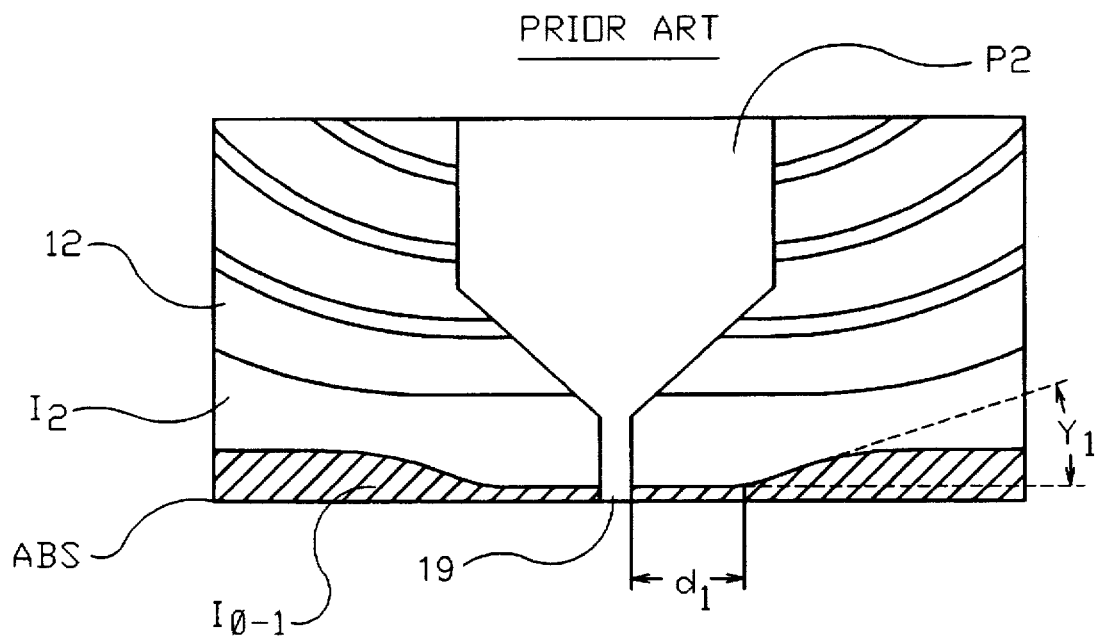
FIG. 2A is a partial top view of a typical prior art thin film magnetic head assembly showing the flat area and shallow angle of the gap layer insulation adjacent to the pole tip region.

As represented in FIG. 2A, prior art thin film heads are made with a transducing gap insulation layer $I_{0-1}$ configured with a flat area extending a distance $d_1$ from the pole tip region and then angles at a relatively low angle $Y_1$ before flattening away from the pole tip region. With the distance $d_1$, which may be in the order of 5 microns and the shallow angle of the extending portion of the overcoat layer 18, which may be about 0-20 degrees, there is minimal contact between the overcoat layer 18 and the insulation gap layer $I_{0-1}$. Therefore the insulation is more susceptible cracking with resultant loss of the processed head assembly during test or during operation in a disk drive.

Figure 2B:
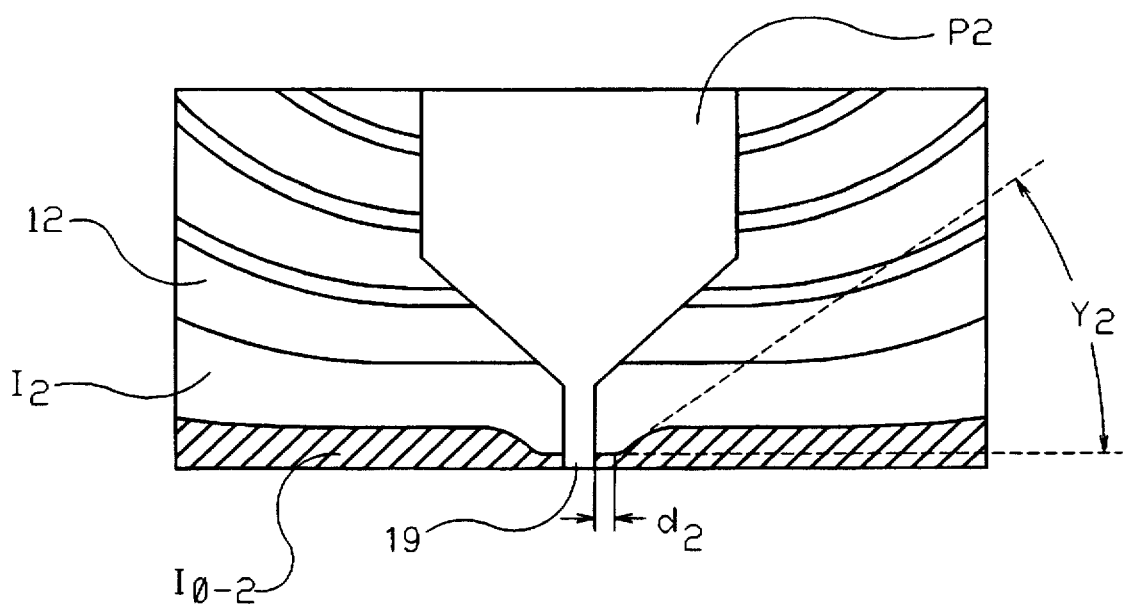
FIG. 2B is a partial top view of a thin film magnetic head showing the angled and arcuate area of the insulation adjacent to the pole tip region, as implemented according to this invention.
Figure 3A:
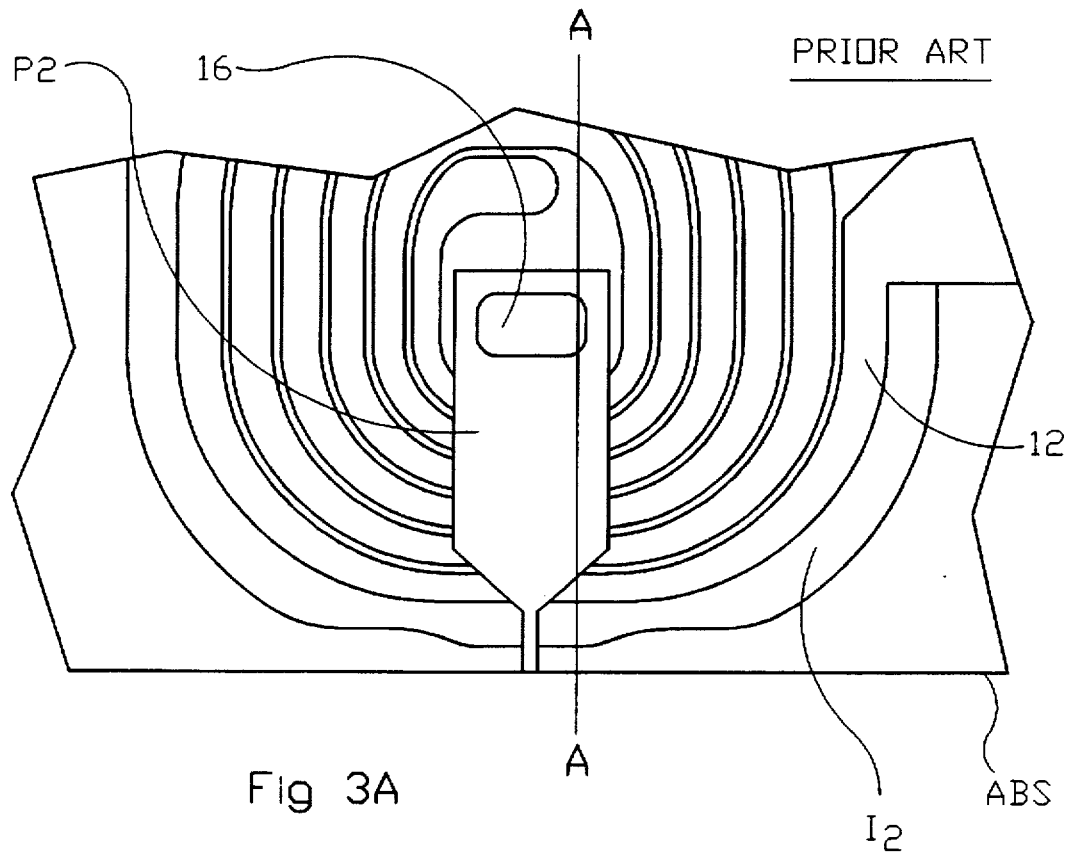
FIG. 3A is an enlarged partial view of the prior art magnetic head of FIG. 2A.
Figure 3B:
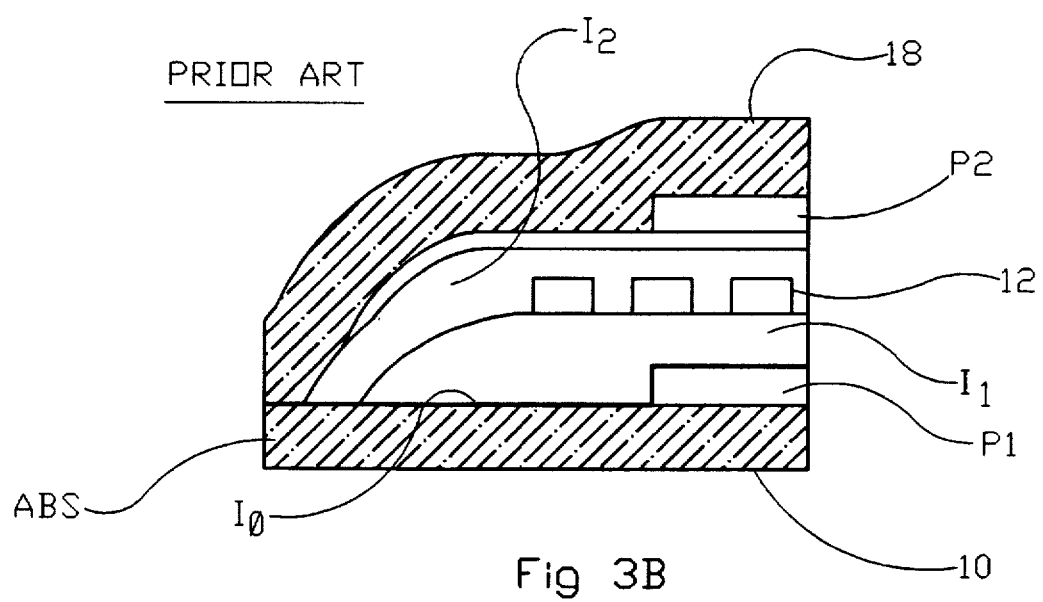
FIG. 3B is a partial cross-section view, taken along line A—A, of the magnetic head of FIG. 3A.
Figure 4A:
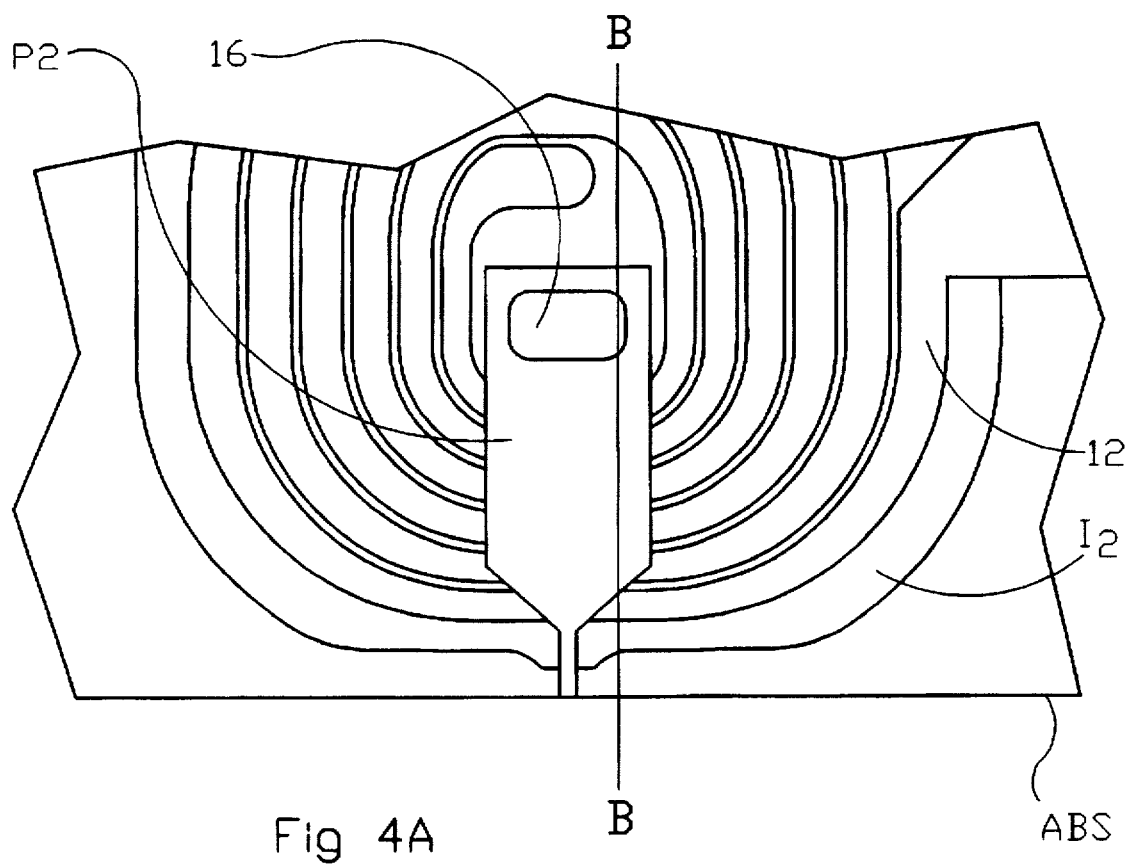
FIG. 4A is an enlarged partial view of the novel configured magnetic head depicted in FIG. 2B.
Figure 4B:
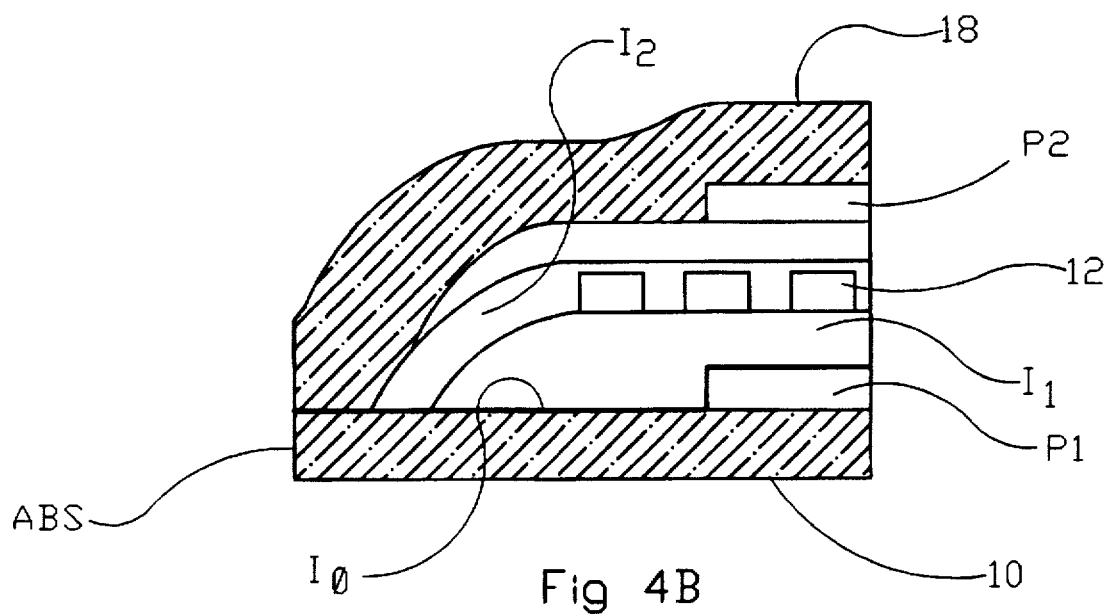
FIG. 4B is a partial cross-section view, taken along line B—B, of the magnetic head of FIG. 4A.
Figure 5:
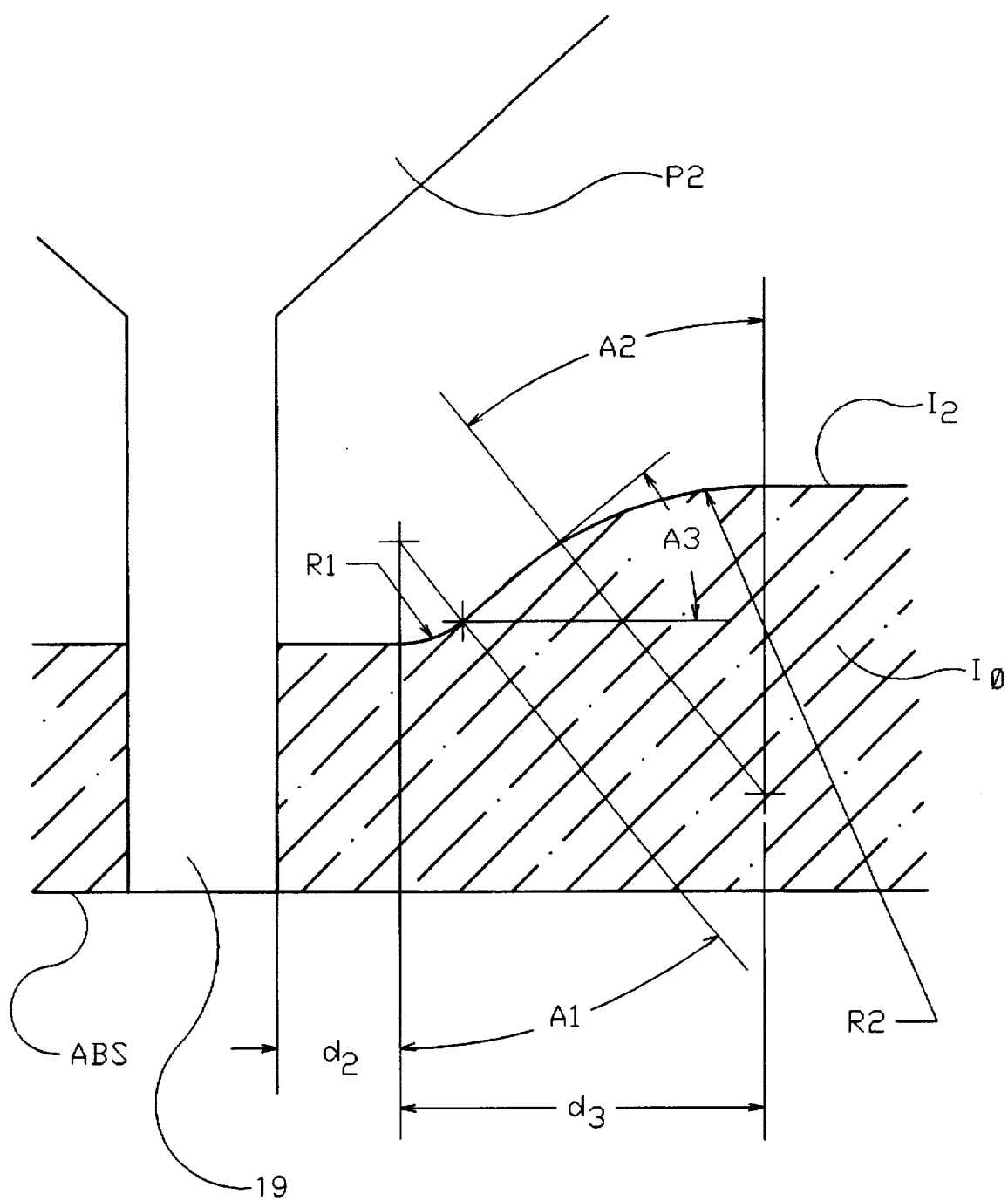
FIG. 5 is an enlarged representation of a section of the configured transducer of this invention, showing a smaller flat area and a curvilinear section with a compound angle, in accordance with this invention.

In keeping with this invention, as illustrated in FIG. 2B, the insulation layer $I_{0-2}$ that forms the transducing gap is configured so that the insulation is flat for a very short distance $d_2$, which may be about 2 to 4 microns and is sufficient to exceed the photoresist insulation rounding effect that is found on the sides of the P2 pole layer and preclude any misalignment on the sides of the pole layer. Following the flat area, the $I_{0-2}$ layer then forms a compound angle Y2 of approximately 40° or greater relative to the short flat area. The compound angled area, as shown in detail in FIG. 5, has a steep first angle A1, starting at about the distance $d_2$, in the range of about 40° with a radius R1, followed by an equal slope or arcuate portion with a second angle A3 approximately equal to angle A1, and then followed by a shallow curve of angle A2 approximately equal to angle A1 but having a radius R2, which then flattens at distance $d_2$ plus $d_3$ from the pole tip 19, which may be about 10 microns measured from the pole tip 19 along the ABS. The pole tips 17 and 19 are formed with a width in the range of about 4 to 8 μm (micrometers).

In practice, the thin film head transducer design is achieved by photomask procedures and patterned on the wafer or substrate from which the sliders are fabricated. By providing a transducing gap insulation layer $I_0$ configured with the compound angled region and with a steeper angle near the pole tip area, in accordance with this invention, the contact area between the protective overcoat layer 18 of the transducer and the transducing gap layer $I_0$ is maximized so that cracking of the insulation which usually occurs along the air bearing surface of the head slider is effectively minimized. With the novel insulation geometry, sufficient insulation is provided for the coil turns. By virtue of the inventive design, the coil is maintained close to zero throat and the ABS, and high efficiency of the coil is realized.

What is claimed is:

1. A thin film magnetic head comprising:

a nonmagnetic substrate defining an air bearing surface;

a thin film transducer disposed on said substrate, said transducer including first and second magnetic layers that form a continuous magnetic path, said magnetic layers having first and second pole tip sections respectively;

an electrical coil means disposed between said magnetic layers and electrically insulated from said magnetic layers;

an insulation gap layer disposed between said coil means and said first magnetic layer, said insulation gap layer defining a transducing gap between said first and second pole tip sections;

a protective insulating layer formed over said transducer, said insulation gap layer and said protective insulating layer being in contact to form a contact area therebetween;

said contact area configured with a compound angled section having a short flat portion extending a distance d2 from said pole tip sections of between two to four microns, followed by a first arcuate portion curving away from said air bearing surface to form an angle with an extended plane of said short flat portion of at least approximately 40°, followed by a second arcuate portion curving in a direction opposite to said curving of said first arcuate portion, and followed by an extended flat portion beginning at a distance d3 plus the distance d2 from said pole tip sections, wherein the distance d3 is greater than the distance d2, so that said contact area between said protective insulating layer and said insulation gap layer is maximized, whereby cracking along said air bearing surface is minimized.

2. A thin film magnetic head as in claim 1, wherein said angle is about 40°.

3. A thin film magnetic head as in claim 1, wherein said protective insulating layer and said insulation gap layer are made of the same material.

4. A thin film magnetic head as in claim 3, wherein said material is alumina.

5. A thin film magnetic head as in claim 1, wherein said electrical coil means is close to zero throat of said transducer.

6. A thin film magnetic head as in claim 1, wherein said pole tip-sections are each formed to a width in the range of 4 to 8 micrometers.

* * * * *